April 9, 1963 M. P. FORSTER ETAL 3,084,949
FOLDING STROLLER WITH TELESCOPIC HANDLE
Filed Jan. 16, 1961 3 Sheets-Sheet 1

INVENTORS
MILTON P. FORSTER
STANLEY J. PECK
HUGH W. TANNER
BY
ATTORNEY

April 9, 1963   M. P. FORSTER ETAL   3,084,949
FOLDING STROLLER WITH TELESCOPIC HANDLE
Filed Jan. 16, 1961   3 Sheets-Sheet 2
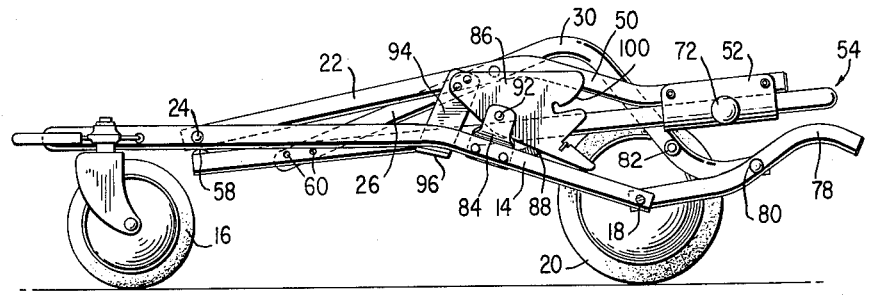
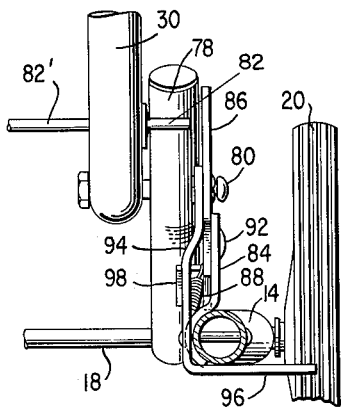
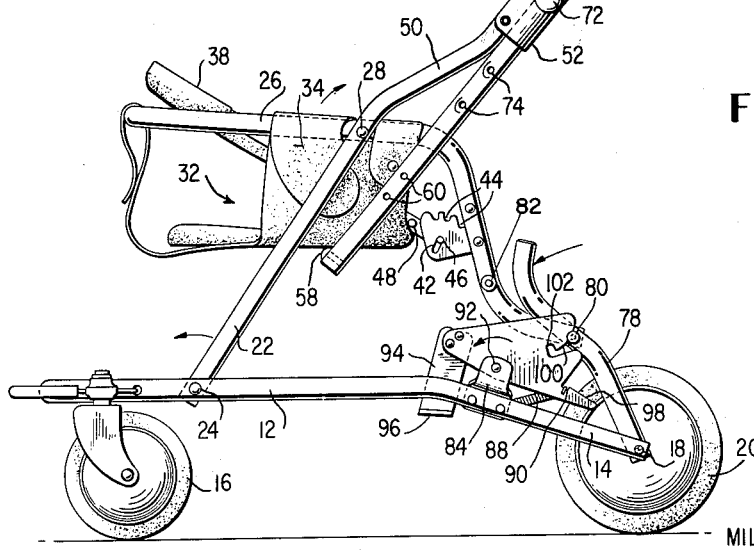
INVENTORS
MILTON P. FORSTER
STANLEY J. PECK
HUGH W. TANNER
BY
*ATTORNEY*

April 9, 1963   M. P. FORSTER ETAL   3,084,949
FOLDING STROLLER WITH TELESCOPIC HANDLE
Filed Jan. 16, 1961   3 Sheets-Sheet 3
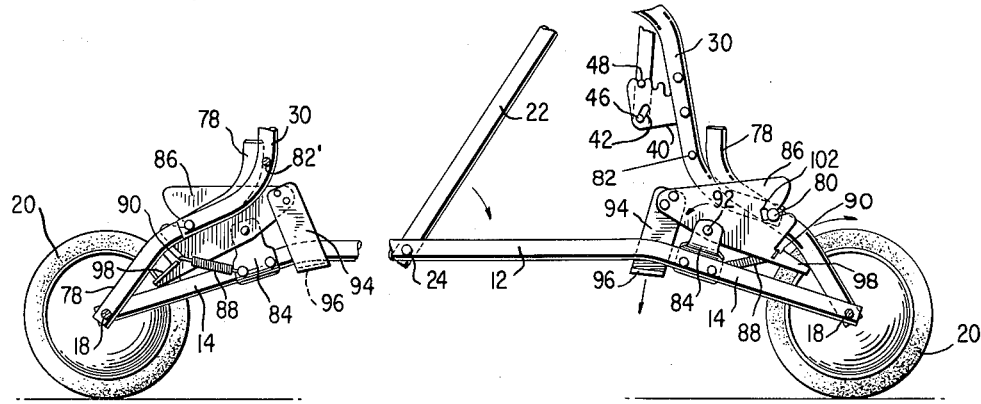
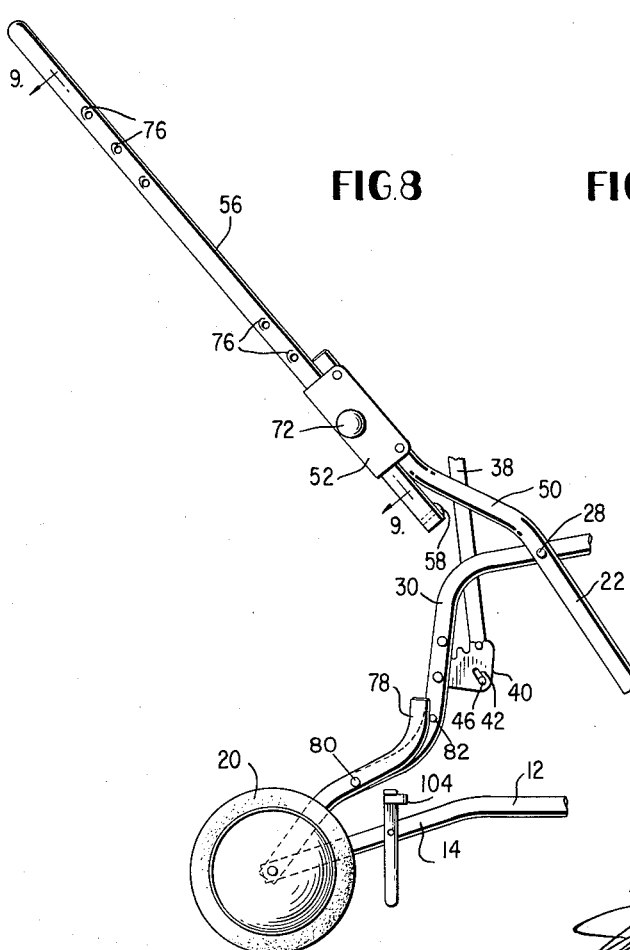
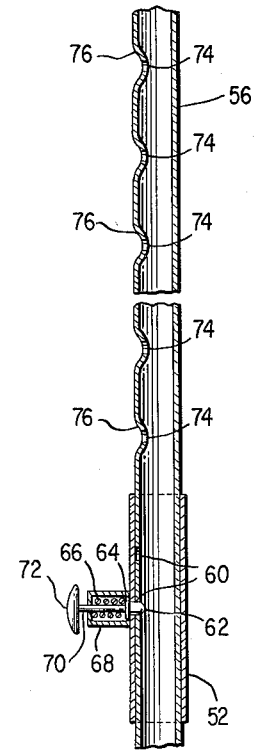
INVENTOR.
MILTON P. FORSTER
STANLEY J. PECK
HUGH W. TANNER
BY
ATTORNEY

United States Patent Office 3,084,949
Patented Apr. 9, 1963

3,084,949
FOLDING STROLLER WITH TELESCOPIC HANDLE
Milton P. Forster, Stanley J. Peck, and Hugh W. Tanner, Portsmouth, Va., assignors to Pen Dee, Incorporated, Portsmouth, Va., a corporation of Virginia
Filed Jan. 16, 1961, Ser. No. 82,923
13 Claims. (Cl. 280—36)

This invention relates to foldable frame structures for baby strollers or the like and more particularly to improvements in folding strollers embodying toggle joints and telescopic handles.

During past recent years, foldable baby strollers have enjoyed considerable commercial success. In spite of the variety of such items marketed and sold, the strollers available to the buyer in the market place are subject to a number of defects and disadvantages. Included among these defects are the following:

The stroller when in folded condition, is not as compact as possible by reason of the protrusion of a long handle by means of which the stroller is propelled.

In those instances where means are provided for also folding, or telescoping, the handle, extra operations are added to collapse and unfold the stroller.

When telescoping handles are provided, the means for unlatching these to fold, or collapse, the stroller are inconveniently located, as for example on the under side of the handle, which makes it extremely difficult for a woman holding a baby and/or packages to bend over, find the latches and operate them. This difficulty also applies to large breasted, nursing mothers and to short, pregnant women.

When strollers are provided with telescoping handle side bars, these usually nest one within the other requiring the use of straight bars. This makes it inconvenient to properly design the stroller seat for placement at the appropriate elevation and with proper inclination of the seat back.

When strollers are provided with telescoping handle side bars of the straight bar variety and having internal spring latches, the latches are difficult to operate, and frequently become inoperable because of failure of the springs, which are either too stiff, too loose, or become dirt clogged.

When strollers are provided with telescopic handles whose side bars contain openings in the sides of the handle tubes, for retention of canopy support means for example, it has been necessary to place the handle latch openings elsewhere than in the convenient side locations where the latches would be easier to reach and easier to operate, to prevent latching in the canopy support openings.

In unfolding the conventional stroller, the latch means provided for locking the toggle joint to retain the stroller in open condition frequently requires manual operation which involves stooping of the operator with the attendant difficulties as explained above.

Similarly, to collapse the conventional stroller, the latch means usually must be manually operated and is normally located in an inconvenient place under the rear portion of the seat which again involves stooping on the part of the operator.

It is an important object of the present invention to provide a stroller so constructed as to obviate the above stated disadvantages of conventional strollers.

It is another important object of this invention to provide a collapsible frame structure for baby strollers, or the like, which can be unfolded or extended automatically to its open condition and latched therein by one pulling motion applied to the telescopic handle of the frame structure.

A further important object of this invention is to provide a foldable stroller having toggle joint latch means automatically operable upon unfolding of the stroller to retain the stroller in its unfolded condition and said latch means being operable by application of foot pressure to release the latch, break the toggle point and collapse the stroller.

Yet another object of the present invention is to provide, in a collapsible stroller of the above described characteristics, latch means for automatically locking the toggle joint of the stroller on extension of the stroller from its collapsed to its unfolded condition.

Still another object of the invention is to provide a collapsible stroller having telescopic, handle side bars, said handle side bars having latches positioned on the outer sides at a convenient height to the operator, whereby the handles may be released and nested conveniently by the operator without having to stoop or reach under the handle or under the stroller frame.

A still further object of the invention is to provide a collapsible baby stroller of the above described characteristics and having telescopic handles wherein additional apertures to the latch apertures are provided in the same sides of the handle bars for housing canopy support means, such canopy support apertures being recessed so as to avoid engagement with the latch pins of the telescopic handle during movement of the handle to extended or nested positions so as not to intefere with the telescopic action of the handle.

Yet a further object of the invention is to provide a collapsible baby stroller having a telescoping handle formed in two sections, one of which is bent out of line to improve the seat position, and having a sleeve attached to the bent section within which the other section telescopically slides.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings wherein like reference characters indicate like parts throughout the several figures and in which:

FIG. 3 is a side elevation, similar to FIG. 2, but showing the stroller in its collapsed, or folded, condition with portions of the folded seat omitted for purposes of clarity;

FIG. 4 is an elevational view, similar to FIG. 2, but showing the stroller in process of being unfolded by a pulling movement on the handle, with the frame elements moving in the directions indicated by the arrows, and at an instant when the toggle pivot means is entering the latch groove of the latch plate;

FIG. 5 is a fragmentary view of the toggle joint and latch taken from line 5—5 of FIG. 2 and looking in the direction of the arrows;

FIG. 6 is a fragmentary, side elevation showing the stroller toggle joint and frame, during its collapsing operation at the instant just after the foot lever has started to move downwardly and the latch plate has engaged the toggle member to break the toggle joint, the parts of the frame moving in the directions indicated by the arrows;

FIG. 7 is a fragmentary, side elevation taken from the side opposite to that of FIG. 6 and showing the latch plate and toggle joint in their latched condition;

FIG. 8 is a fragmentary, elevational view taken from the inside of the frame and showing the side opposite to that of FIG. 2; and FIG. 9 is a fragmentary, sectional view taken from the line 9—9 of FIG. 8 and looking in the direction of the arrows.

Figure 1:
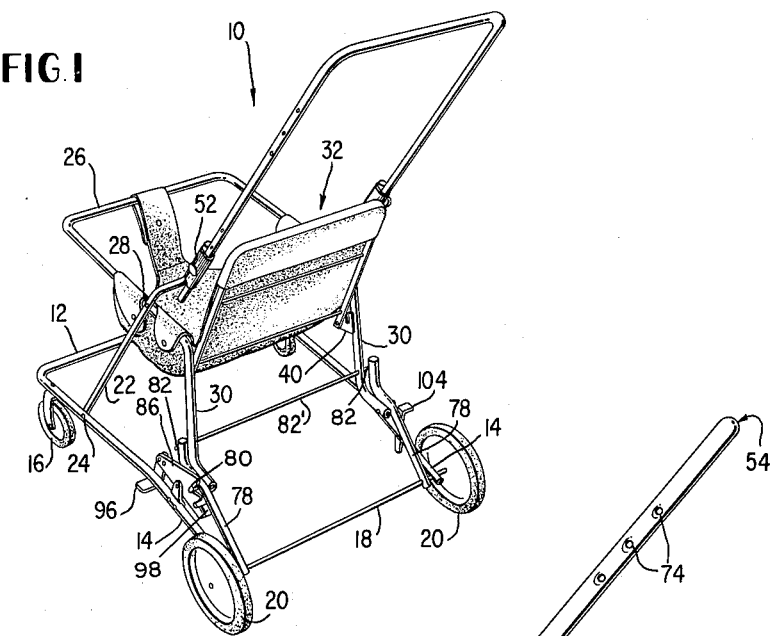
FIG. 1 is a perspective view of a foldable, or collapsible, frame structure as applied to a baby stroller and embodying the improved toggle latch and telescopic handle of the present invention.

Referring now more particularly to the drawings, wherein is shown, for illustrative purposes, a preferred embodiment of the invention in the form of a baby stroller 10, comprising a foldable frame having a telescoping handle. The stroller frame structure 10 includes a horizontally disposed, U-shaped, tubular base frame 12 having downwardly extending rear sections 14. A pair of front wheels 16 are swivelly mounted at the forward end of the base frame 12. An axle 18 spans the rear of the frame 12 passing through transverse bores in the end portions 14. The rear wheels 20 are mounted to the respective ends of axle 18.

Extending upwardly from the front of frame 12 are a pair of tubular handle members 22 whose bottom ends are pivoted to the base frame by means of rivets 24, or other suitable means. A U-shaped tubular arm rest member 26 is pivotally mounted to the handle bars 22 by pivot means 28. The arm rest member extends downwardly at the rear thereof as shown at 30, and thence is bent rearwardly in a direction generally towards the axle 18.

A seat, generally indicated at 32, is supported from the forward portion 26 of the arm rest by a flexible member 34. The seat comprises a bottom plate 36 and a swingable back plate 38. The rear portions 30 of the arm rest have affixed thereto a pair of vertical seat brackets 40, each having an upwardly inclined slot 42 and a plurality of notches 44 opening in its upper edge. The seat plate 38 carries a pair of pins 46 and 48 which respectively engage within the slot 42 and the notches 44. It will be readily seen that by lifting the seat back 38, it may be turned to engage the pins 48 in different notches so as to incline the seat back at various positions or to totally disengage the pins 48 for folding the seat back 38 downwardly into a forward position (see FIG. 4), when the stroller is collapsed. The seat, as above described, is conventional and will therefore not be described in further particulars.

The upper ends of the handle tubes 22 are offset rearwardly and upwardly, as shown at 50, and to the outer ends thereof are fixed a pair of sleeves 52 by means of rivets, or other suitable means. Slidably received in the sleeves 52 are the straight side arms 56 of a U-shaped handle member 54, preferably formed of tubular material. Thus, the stroller handle comprises a lower section, formed of the bars 22, and an upper section, formed of the bars 56, which telescope with respect to each other by means of the connecting sleeves 52.

The offset portions 50 of the lower section, permit the proper elevation and inclination of the seat of the stroller, while the sleeves 52 hold the handle sections in side by side juxtaposition and enable telescoping without the need for straight bars in both sections of the handle. To prevent complete disassembly of the handle sections on unfolding movements of the stroller, a pair of stop members 58 are secured to the tubular side walls at the lower ends of the bars 56. These stops are preferably in the form of headed elements threadedly, or otherwise, secured in the side wall adjacent the ends of the handle section. Thus, on extension of the handle section 54, the heads of the stops 58 are wedged between the side bar 56 and the offset portions 50 of the lower handle section and disassembly of the sections is prevented without deformation of the lower edges of the sleeves 52 and except by deformation of the tubular end edges of the upper handle section.

Figure 2:
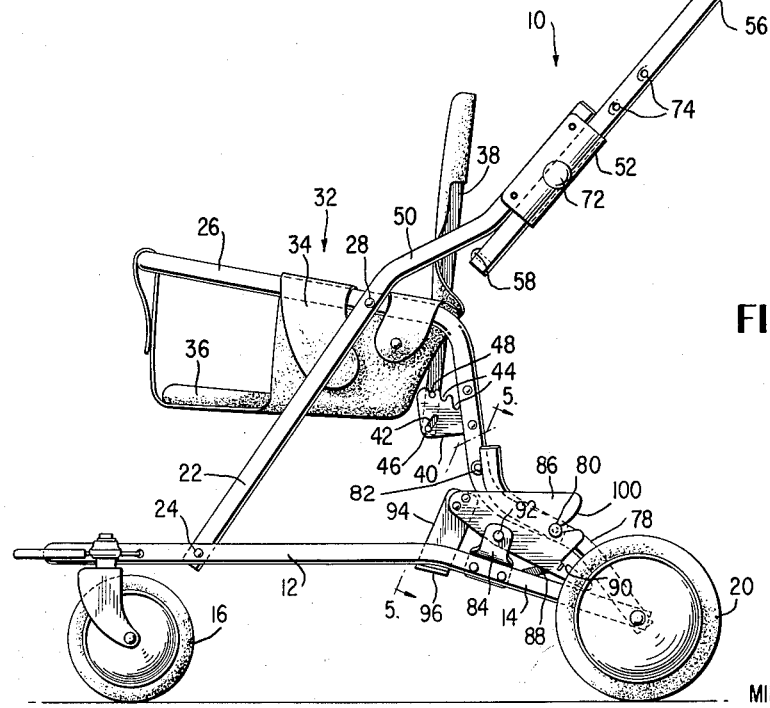
FIG. 2 is an enlarged, side elevation of the stroller with the toggle shown in its latched and locked condition and the handle extended to its operating position.

Referring more particularly to FIGS. 8 and 9, it will be seen that the side arms 56 of the handle are provided with one or more drilled openings 60 near the lower ends thereof which are adapted to receive spring biased latch pins 62. Each pin is provided with a head 64 which limits the depth of penetration of the pin and which receives the pressure of the spring 66 housed in a latch casing 68, secured in a suitable manner to each sleeve 52. The pins 62 may be retracted against the pressure of springs 66 by means of the rods 70 connected to the pins and having manipulatable heads 72. As illustrated particularly in FIGS. 2 and 8, the latch heads 72 are preferably extended sidewardly from the handle frame sections so that they may easily be reached and pulled outwardly by the stroller operator without having to bend or stoop forwardly as would be necessary if the handle latches were placed inside or beneath the sleeve and handle surfaces.

The upper frame arms 56 are additionally provided with a plurality of spaced apertures 74, each of which is recessed in a dimple 76 as most clearly shown in FIG. 9. The apertures are provided for the purpose of receiving conventional canopy supports, or the like, which are not illustrated. Openings 74, like the apertures 60, are positioned in the outer sides of handle arms 56 but do not interfere with the telescoping action of the handle sections by reason of their recessed structure. Placement of the openings 74 in the dimple enables the latch pins 62 to ride over the openings without entering them because the depth of movement of the pins is limited by the stops 64 of the latches. The pins have rounded noses so that movement of the handle arms 56 will cam, or force, the pin out of the opening 60.

The two, parallel, rear ends 30 of the arm rest frame 26 are linked to the base frame 12 by a pair of toggle members 78, the bottom ends of which are pivoted to and around the axle 18 and are thus pivotally mounted to the rear of the base frame members 14. The toggle members 78 are preferably elongate tubes, which are bent forwardly and upwardly as illustrated, and which are pivoted to the arm rest members 30 to intermediate their ends by means of headed pivot pins 80. The upper ends of the toggle members 78 are adapted to rest against and be positioned by stops 82 when the stroller frame 10 is in its unfolded or open condition. These stops 82 may comprise stirrups or the like but conveniently may be formed by the ends of a bar 82' extending between the downturned portions 30 of the arm rest which serves as a hanger for a package carrier but also braces the free ends of the arm.

It will be apparent from the above and the drawings that the toggle members 78 and the arm rest frame members 30 form a toggle joint, or linkage connection, between the handle frame 22 and the base frame 12. When the frame parts are in normal, or open, unfolded position, the axis of the pivotal connections 80 between the frame portions 30 and toggle members 78 is forwardly and downwardly offset from, or downwardly over center of a line passing through the axis of pivotal connection 18 of the members 78 with the base frame and the axis of pivotal connection 28 between the frame portions 22 and the arm rest portions 26, 30. Thus, the stroller frame structure is securely held in its open position by the aforesaid toggle joint, by the resting of toggle members 78 against the stops 82 and by the force exerted by the weight of the occupant in the seat 32.

To further insure the securement of the stroller frame in its unfolded condition, there is provided an improved latching mechanism comprising a bracket 84 secured to a rear base frame section 14 and pivotally supporting a vertically positioned latch plate 86 of triangular shape. The latch plate 86 is normally retained, with the rear of its lower edge touching the base frame portion 14, by a coil spring 88 having one end hooked through a notch 90 in the rearward vertex of the latch plate and its other end suitably secured to the base frame, preferably by means of the bolt, or rivet, which also secures the bracket 84, (see FIG. 7). Intermediate the ends of the bottom edge of latch plate 86, the support plate 84 is pivoted to the latch plate by means of a pin 92.

The forward end of the latch plate has affixed thereto a right angle lever 94 having an arm 96 which extends outwardly under the base frame 12 to a position where it may be engaged by the foot of the operator while standing behind the stroller. The latch plate 86 is further provided at its rear end beyond the notch 90 with an inturned flange 98 which is adapted to strike the associated toggle member 78 when the foot lever 96 is depressed. The rearward facing edge of the pivoted latch plate 86 is provided with a cam shaped slot 100 having a widened opening adapted to receive the pivot pin 80 which connects the toggle member 78 to the arm rest portion 30. At the inner end of slot 100, there is provided an upwardly directed notch 102 which is adapted to receive the pin 80 in its over center, toggle joint position and lock said pin in this position under the bias of the spring 88 which normally holds the latch plate 86 in locked position.

The foot lever 96 engages the under side of the stroller base frame 12 when the latch plate 86 is in its normal latching position, (see FIG. 2) and thus holds the latch plate in its locking position until depressed by the foot of the operator. Only one latch plate 86 is required to hold the stroller frame in its unfolded condition and therefore, an additional latch plate is not shown on the other side to hold the second toggle member 78. As shown in FIGS. 1 and 8, instead of a second latch plate, a conventional, pivoted and foot operated brake 104 is illustrated on the other side of the stroller adapted to be used by the operator to stop the movement of the stroller when necessary.

The stroller described above is shown in FIG. 3 in its collapsed condition in which, as illustrated, it forms a very small, compact, folded frame with the telescoping handle section 54 nested within the outlines of the stroller frame. To unfold the stroller and lock it in its open position, shown in FIG. 2, it is merely necessary for the operator to grasp the handle 54 and lift it upwardly and rearwardly in one motion, simultaneously expanding the frame and forcing the stroller forwardly. The stroller frame elements will then move as indicated by the arrows in FIG. 4, the arm rest 26 moving upwardly and clockwise, and the toggle members 78 moving upwardly but counter-clockwise. When the frame elements reach their position, shown in FIG. 4, the toggle pivot 80 will just have entered the groove 100 and started to cam the latch plate 86 in a counterclockwise direction about its pivot 92 and against the bias of the spring 88.

Further motion of the handle section 54 upwardly and rearwardly will cause the toggle pivot 80 to seat in the notch 102 where it will be locked by action of the toggle spring 88. About the same time, the latch pins 62 will seat in a set of the openings 60 at the bottom of the handle arms 56, locking the handle in its extended position. When it is desired to collapse the stroller frame, the operator, without moving from position behind the handle 54, need merely step on the foot pedal 96 causing the latch plate 86 to turn in a counter-clockwise direction as illustrated in FIG. 6. This brings the abutment flange 98 of the latch plate to bear against the toggle member 78, turning the latter clockwise and breaking the toggle joint. Thus, the toggle pivot 80 moves out of the notch 102 and out of the slot 100 under pressure exerted by the operator's foot on the latch plate.

As soon as the pivot 80 has moved from the notch 102 into slot 100 and partially out of the latch plate, it will have passed over center and the weight of the frame elements will break the toggle joint further and collapse the stroller frame structure into the condition shown in FIG. 3. Therefore, it is very simple for the operator of the stroller, even though her arms may be laden with a child or packages, to collapse the frame merely by stepping on the foot pedal 96. The handle section may be collapsed before the toggle joint is broken or if desired, afterward when the frame elements have assumed their positions in FIG. 3. To collapse the handle, it is merely necessary to grasp the latch heads 72 on each side of the handle, pull them outwardly and exert sufficient pressure to slide the handle arms 56 through the sleeves 52.

It should be noted that the bar 82' may readily serve together with the axle 18, as supports for removable hanging of a receptacle for packages, not shown in the drawings. It should further be apparent from the above description that the described stroller is simple of construction, automatic of operation, and extremely convenient to use. While the invention has been described in connection with the frame structure of a baby stroller, it is apparent that it may be equally applicable to other collapsible and foldable frame structures.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. In a foldable frame structure for a baby stroller or the like, a base frame, an inclined handle frame pivotally mounted upon and extending upwardly from said base frame, an arm rest frame pivotally connected to said handle frame, a toggle member pivotally mounted on said base frame, pivot means pivoting the lower end of said arm rest frame to the upper portion of said toggle member, a spring biased latch plate pivotally mounted on said base frame and having a cam groove adapted to automatically receive said pivot means pivoting the arm rest to the toggle member in a latching relation upon unfolding movement of said frame structure, and an arm fixed to said latch plate and extending laterally beyond the confines of said base frame within normal reach of the foot of a person pushing said stroller frame structure, whereby foot pressure on said arm will turn the latch plate to release the toggle joint.

2. In a foldable frame structure for a baby stroller or the like, a base frame, an inclined handle frame pivotally mounted upon and extending upwardly from said base frame, an arm rest frame pivotally connected to said handle frame, a toggle member pivotally mounted on said base frame, pivot means pivoting the lower end of said arm rest frame to the upper portion of said toggle member, a spring biased latch plate pivotally mounted on said base frame and having a cam groove adapted to automatically receive said pivot means pivoting the arm rest to the toggle member in a latching relation upon unfolding movement of said frame structure, and an arm fixed to said latch plate and extending laterally beyond the confines of said base frame within normal reach of the foot of a person pushing said stroller frame structure, whereby foot pressure on said arm will turn the latch plate to release the toggle joint said arm fixed to said spring biased latch plate being engageable with said base frame to limit the turning movement of the latch plate under bias of its spring to the locking position of the toggle member.

3. In a foldable frame structure for a baby stroller or the like, a base frame, an inclined handle frame pivotally mounted upon and extending upwardly from said base frame, an arm rest frame pivotally connected to said handle frame, a toggle member pivotally mounted on said base frame, pivot means pivoting the lower end of said arm rest frame to the upper portion of said toggle member, a spring biased latch plate pivotally mounted on said base frame and having a cam groove adapted to automatically receive said pivot means pivoting the arm rest to the toggle member in a latching relation upon unfolding movement of said frame structure, and an arm fixed to said latch plate and extending laterally beyond the confines of said base frame within normal reach of the foot of a person pushing said stroller frame structure, whereby foot pressure on said arm will turn the latch plate to release the toggle joint said arm rest frame at its lower end including a pair of spaced, downturned members, said spaced members being connected by a brace bar, and said toggle member including an upwardly directed end portion above said pivot means, said upwardly directed end portion of the toggle member being adapted to strike said brace bar of the arm rest frame on unfolding of the frame structure to prevent further unfolding movement beyond the lock position of the toggle joint.

4. In a foldable frame structure for a baby stroller or the like, a base frame, an inclined handle frame pivotally mounted upon and extending upwardly from said base frame, an arm rest frame pivotally connected to said handle frame, a toggle member pivotally mounted on said base frame, pivot means pivoting the lower end of said arm rest frame to the upper portion of said toggle member, a spring biased latch plate arranged to lock said arm rest frame and toggle member in a beyond center toggle joint defining the unfolded position of said frame structure, and foot-operated means for releasing said latch means to allow said frame structure to fold, said latch plate having a cam groove adapted to automatically receive said pivot means pivoting the arm rest to the toggle member in a latching relation upon unfolding movement of said frame structure, said cam groove extending in a rearward and upward direction and having a widened mouth to permit entrance of said pivot means, and the inner end of said cam groove terminating in an upwardly directed locking notch.

5. In a foldable frame structure for a baby stroller or the like, a base frame, an inclined handle frame having telescoping sections pivotally mounted upon and extending upwardly from said base frame, an arm rest frame pivotally connected to said handle frame, a toggle member pivotally mounted to said base frame, pivot means pivoting the lower end of said arm rest frame to the upper portion of said toggle member, a fulcrumed latch means arranged to lock said arm rest frame and toggle member in a beyond center toggle joint defining the unfolded position of said frame structure, said fulcrumed latch means comprising a spring biased plate having a cam groove adapted to automatically receive said pivot means pivoting the arm rest to the toggle member in latching relation upon unfolding movement of said frame structure, and one of the said telescoping sections being adapted to be grasped and lifted outwardly when said frame structure is in its folded condition whereby to unfold said frame structure, lock said toggle member and arm rest in beyond center toggle joint relation, and extend the handle frame to an operative position in one movement, said telescoping sections of the handle frame including a lower section pivoted to said base frame and having a pair of sleeves affixed thereto at the upper ends of the sides thereof, an upper section slidably received in said sleeves and having a plurality of openings in the side walls thereof, and latch means for automatically locking the said upper section in an extended position and including spring biased pins adapted to enter said openings automatically, said latch pins having laterally extending heads which may be manually moved outwardly to remove said pins from said openings to enable adjustment and collapsing of said handle sections, and said upper of said handle frame sections being further provided with additional openings in the side walls thereof for support of a canopy, said additional openings being recessed in dimples whereby to permit said spring biased pins of said latch means to cross over without entering said additional openings during collapse and extension of said handle frame sections.

6. In a foldable frame structure for a baby stroller or the like, the combination set forth in claim 5 wherein said lower handle section includes a pair of tubular arms which are offset in the portion between their pivoted lower ends and their upper ends to which said pair of sleeves are affixed, said upper handle section being U-shaped and formed of tubular material and being provided with a stop to limit outward extension thereof and prevent disassembly, said stop comprising a headed member secured in the tubular wall of said upper section facing said lower section, the head of said member being adapted to wedge between the said offset portions of said tubular arms and the lower portions of said upper section when the latter is extended to the limit of its outward movement.

7. In a foldable frame structure for a baby stroller or the like, a base frame, a handle frame pivotally mounted at its lower end upon the front portion of said base frame and extending upwardly and rearwardly therefrom, a toggle jointed seat supporting frame pivotally supported at its lower end upon the rear portion of said base frame and extending upwardly and forwardly of said base frame in crossing relation to said handle frame, pivots connecting said handle and seat supporting frames so that in unfolded condition said frames are in a generally triangular relation with the toggle joint of said seat supporting frame in over-center position, and fulcrumed latch means on said frame structure to lock said seat supporting frame in extended position with its toggle joint in a beyond center relation, said latch means including a locking portion, manually operated means for turning said latch means and releasing said locking portion to allow said frame structure to fold, and a cam portion connected to said locking portion and engageable with said seat supporting frame to break the toggle joint thereof and collapse said frame structure on operation of said manually operated means.

8. In a foldable frame structure for a baby stroller or the like, a base frame, an inclined handle frame pivotally mounted upon and extending upwardly from said base frame, an arm rest frame pivotally connected to said handle frame, a toggle member pivotally mounted on said base frame, pivot means pivoting the lower end of said arm rest frame to the upper portion of said toggle member, latch means extending from said toggle member, a spring biased latch plate pivotally mounted on said base frame and having a cam groove adapted to automatically receive said latch means in a latching relation upon unfolding movement of said frame structure, said latch plate including a cam portion engageable with said toggle member to break the toggle joint and collapse said frame structure, and an arm fixed to said latch plate and extending laterally beyond the confines of said base frame within normal reach of the foot of a person pushing said stroller frame structure, whereby foot pressure on said arm will turn the latch plate to release and break the toggle joint to enable ready folding of said frame structure.

9. In a foldable frame structure for a baby stroller or the like, a base frame, an inclined handle frame pivotally mounted upon and extending upwardly from said base frame, an arm rest frame pivotally connected to said handle frame, a toggle member pivotally mounted on said base frame, pivot means pivoting the lower end of said arm rest frame to the upper portion of said toggle member, and a fulcrumed latch means including a spring biased latch plate pivotally mounted on said base frame and having a cam groove adapted to automatically receive said pivot means pivoting the arm rest to the toggle member in a latching relation upon unfolding movement of said frame structure, said latch plate including a cam portion engageable with said toggle member to break the toggle joint and collapse said frame structure.

10. In a foldable frame structure for a baby stroller or the like, the combination set forth in claim 8 wherein said latch means engages said base frame and limits the turning movement of the latch plate under bias of its spring to the locking position of the toggle member.

11. In a foldable frame structure for a baby stroller or the like, the combination set forth in claim 9 wherein said cam groove extends in a rearward and upward direction and has a widened mouth to permit entrance of said pivot means, and the inner end of said cam groove terminates in an upwardly directed locking notch.

12. In a foldable frame structure for a baby stroller or the like, a base frame, an inclined handle frame pivotally mounted upon and extending upwardly from said base frame, an arm rest frame pivotally connected to said handle frame, a toggle member pivotally mounted on said base frame, pivot means pivoting the lower end of said arm rest frame to the upper portion of said toggle member, and a fulcrumed latch means arranged to lock said arm rest frame and toggle member in a beyond center toggle joint defining the unfolded position of said frame structure, said latch means including foot-operated means for releasing said latch means to allow said frame structure to fold, said arm rest frame at its lower end including a pair of spaced, downturned members, said spaced members being connected by a brace bar, and said toggle member including an upwardly directed end portion above said pivot means, said upwardly directed end portion of the toggle member being adapted to strike said brace bar of the arm rest frame on unfolding of the frame structure to prevent further unfolding movement beyond the lock position of the toggle joint.

13. In a foldable frame structure for a baby stroller or the like, a base frame, an inclined handle frame pivotally mounted upon and extending upwardly from said base frame, an arm rest frame pivotally connected to said handle frame, a toggle member pivotally mounted on said base frame, pivot means pivoting the lower end of said arm rest frame to the upper portion of said toggle member, and a fulcrumed latch means arranged to lock said arm rest frame and toggle member in a beyond center toggle joint defining the unfolded position of said frame structure, said latch means including a locking portion releasably engaging said pivot means, foot-operated means for turning said latch means to release said locking portion and allow said frame structure to fold, and a cam portion connected to said locking portion and engageable with one of said toggle member and lower arm rest frame to break the toggle joint and collapse said frame structure on operation of said foot operated means.

References Cited in the file of this patent
UNITED STATES PATENTS

| | | |
|---|---|---|
| 1,802,400 | Benson | Apr. 28, 1931 |
| 2,419,422 | Schulein | Apr. 22, 1947 |
| 2,464,226 | Gottfried | Mar. 15, 1949 |
| 2,471,004 | Moster | May 24, 1949 |
| 2,728,580 | Preisler | Dec. 27, 1955 |
| 2,798,730 | Smith | July 9, 1957 |
| 2,880,011 | Peterson | Mar. 31, 1959 |